United States Patent [19]

Mangold

[11] Patent Number: 4,989,251
[45] Date of Patent: Jan. 29, 1991

[54] HEARING AID PROGRAMMING INTERFACE AND METHOD

[75] Inventor: Stephan E. Mangold, Alingsas, Sweden

[73] Assignee: Diaphon Development AB, Molndal, Sweden

[21] Appl. No.: 192,259

[22] Filed: May 10, 1988

[51] Int. Cl.[5] ................... H04R 25/00; H04R 29/00
[52] U.S. Cl. .................................. 381/68.2; 381/68; 381/60; 73/585
[58] Field of Search ................. 381/68, 68.2, 60; 73/585

[56] References Cited

U.S. PATENT DOCUMENTS

| | | | |
|---|---|---|---|
| 4,187,413 | 2/1980 | Moser | 381/68 |
| 4,425,481 | 1/1984 | Mangold et al. | 381/68.2 |
| 4,471,171 | 9/1984 | Köpke et al. | 381/68 |
| 4,548,082 | 10/1985 | Engebretson et al. | 73/585 |
| 4,596,902 | 6/1986 | Gilman | 381/68 |
| 4,622,440 | 11/1986 | Slavin | 381/68 |

FOREIGN PATENT DOCUMENTS

250679  1/1988  European Pat. Off. ............. 381/68

Primary Examiner—Jin F. Ng
Assistant Examiner—Jason Chan
Attorney, Agent, or Firm—Flehr, Hohbach, Test, Albritton & Herbert

[57] ABSTRACT

A programmable hearing aid has a serial data interface for receiving data transmissions, a decoder for decoding data transmissions, a program memory which stores program data values received via the serial interface, and read control logic that transmits the program data stored in the program memory when the decoder detects the receipt of a predefined read signal. Programming begins with the sending a set of program data values to the programmable hearing aid, preceded by a predefined write signal. The hearing aid automatically mutes or inhibits its operation upon receiving the write signal. A first checksum value corresponding to the program data values sent to the programmable hearing aid is calculated. Next, the data stored in the hearing aid is checked by sending a predefined read signal to the hearing aid, causing the hearing aid to transmitting the program data stored in its program memory. A second checksum value corresponding to the program data transmitted by the hearing aid is calculated and compared with the first checksum value. If the first and second checksum values do not match an error signal is generated and the hearing aid remains muted. If the checksum values do match, an unlock signal is sent to the hearing aid, causing the hearing aid to resume normal operation.

6 Claims, 7 Drawing Sheets

```
INTERFACE UNIT SENDS '1100' TO THE HEARING AID (HA)
DELAY FOR 2 MILLISECONDS
SEND THE 112 BYTES OF DATA STORED IN THE
  MEMORY BUFFER OF THE INTERFACE UNIT
   TO THE HEARING AID
RETURN
```

```
DELAY FOR 4 MILLISECONDS
RETURN
```

FIGURE 7

```
INTERFACE UNIT SENDS '1101' TO THE HEARING AID (HA)
RETURN
```

FIGURE 8

```
INTERFACE UNIT SENDS <CARRIAGE RETURN> TO HOST
SEND THE 112 BYTES OF DATA STORED IN THE
   MEMORY BUFFER OF THE INTERFACE UNIT
   TO THE HOST WHILE GENERATING CHECKSUM OF THIS DATA
SEND TO HOST LSB OF GENERATED CHECKSUM
SEND TO HOST MSB OF GENERATED CHECKSUM
RETURN
```

HEARING AID PROGRAMMING INTERFACE AND METHOD

The present invention relates to hearing aid devices, and particularly to an interface and method or protocol for programming a programmable hearing aid.

BACKGROUND OF THE INVENTION

Programmable hearing aids, such as the hearing aid disclosed in U.S. Pat. No. 4,425,481 (Mansgold et al., 1984) can store a number of distinct programs, or sets of parameter values, each designed for use in different audio environments. For instance, a hearing aid that stores eight distinct programs can have programs for a variety of situations, such as conversing with one person in a quiet room, conversing with several persons in an otherwise fairly quiet environment, conversing with one or more persons in settings with increasing levels of background noise, walking or commuting environments with large noise variations, listening to music in a quiet room, and listening to music in a noisy environment. U.S. Pat. No. 4,425,481 is hereby incorporated by reference.

The various programs in a programmable hearing aid must be customized to compensate for an individual's particular hearing deficiencies. However, some aspects of hearing aid programming are inherently subjective on the part of the user — and therefore hearing aids often must be reprogrammed several times before an optimal set of programs is found. In addition, a person's hearing characteristics may change over time, requiring adjustment of the programs stored in a programmable hearing aid. As a result, programmable hearing aids should be easily reprogrammed.

A copending application, Ser. No. 175,233, entitled AUDITORY PROSTHESIS WITH DATALOGGING CAPABILITY, filed on Mar. 30, 1988, discloses a datalogging system for generating a record of the frequency of usage of each of the programs in a programmable hearing aid. Application Ser. No. 175,233 is hereby incorporated by reference.

Another copending application, Ser. No. 07/192,242 entitled HEARING AID PROGRAMMING INTERFACE, filed on the same date as this application, discloses a miniature interface in a hearing aid, and a corresponding connector, for connecting a hearing aid to a computer reprogramming the device. Application Ser. No. 07/792,242 is also hereby incorporated by reference.

When a programmable hearing aid is programmed with new data, or when a multiple-memory hearing aid is loaded with a new set of data, several considerations must be taken into account. In particular, the programming process should be as fast as possible while being verifiably error free.

In addition, it is desirable to be able to program the hearing aid without removing the hearing aid from the user's ear. However, it would be unacceptable for the hearing aid to generate unpredictably loud and possibly injurious sounds during the programming procedure. In particular, during the programming or program loading process the signal processor in the hearing aid may be temporarily placed into an indeterminate state. This indeterminate state is caused by the fact that it takes a finite amount of time to load a new set of program data into the signal processor, and that the program characteristics of the signal processor during the loading of the program data will be unpredictable. Another problem with the loading of new program data while the hearing aid is still mounted in the user's ear is that the programming process may generate digital noise that affects the operation of the hearing aid.

To prevent operation of the hearing aid when it is in an indeterminate state, and to prevent any possibility of unpleasant and possibly injurious sounds being generated during program selection and reprogramming, the present invention automatically mutes the hearing aids amplification functions during the loading of new program data. Muting is automatically terminated only when the newly loaded program data has been verified as error free. The muting function is also temporarily activated whenever the user switches programs so that the hearing aid's amplification functions are disabled until the new program has been fully loaded into the hearing aid's amplification control circuitry.

SUMMARY OF THE INVENTION

In summary, the present invention is system and method for programming a programmable hearing aid. The programmable hearing aid has a serial data interface for receiving data transmissions, a decoder for decoding data transmissions, a program memory which stores program data values received via the serial interface, and read control logic that transmits the program data stored in the program memory when the decoder detects the receipt of a predefined read signal.

Programming begins with the sending a set of program data values to the programmable hearing aid, preceded by a predefined write signal. The hearing aid automatically mutes its operation upon receiving the write signal. A first checksum value corresponding to the program data values sent to the programmable hearing aid is calculated.

Next, the data stored in the hearing aid is checked by sending a predefined read signal to the hearing aid, causing the hearing aid to transmit the program data stored in its program memory. A second checksum value corresponding to the program data transmitted by the hearing aid is calculated and compared with the first checksum value. If the first and second checksum values do not match an error signal is generated and the hearing aid remains muted. If the checksum values do match, an unlock signal is sent to the hearing aid, causing the hearing aid to cease the muting of its operation.

BRIEF DESCRIPTION OF THE DRAWINGS

Additional objects and features of the invention will be more readily apparent from the following detailed description and appended claims when taken in conjunction with the drawings, in which:

FIGS. 3-10 are flow charts of the communications procedure used to program the hearing aid shown in FIG. 1.

DESCRIPTION OF THE PREFERRED EMBODIMENT

Figure 1:
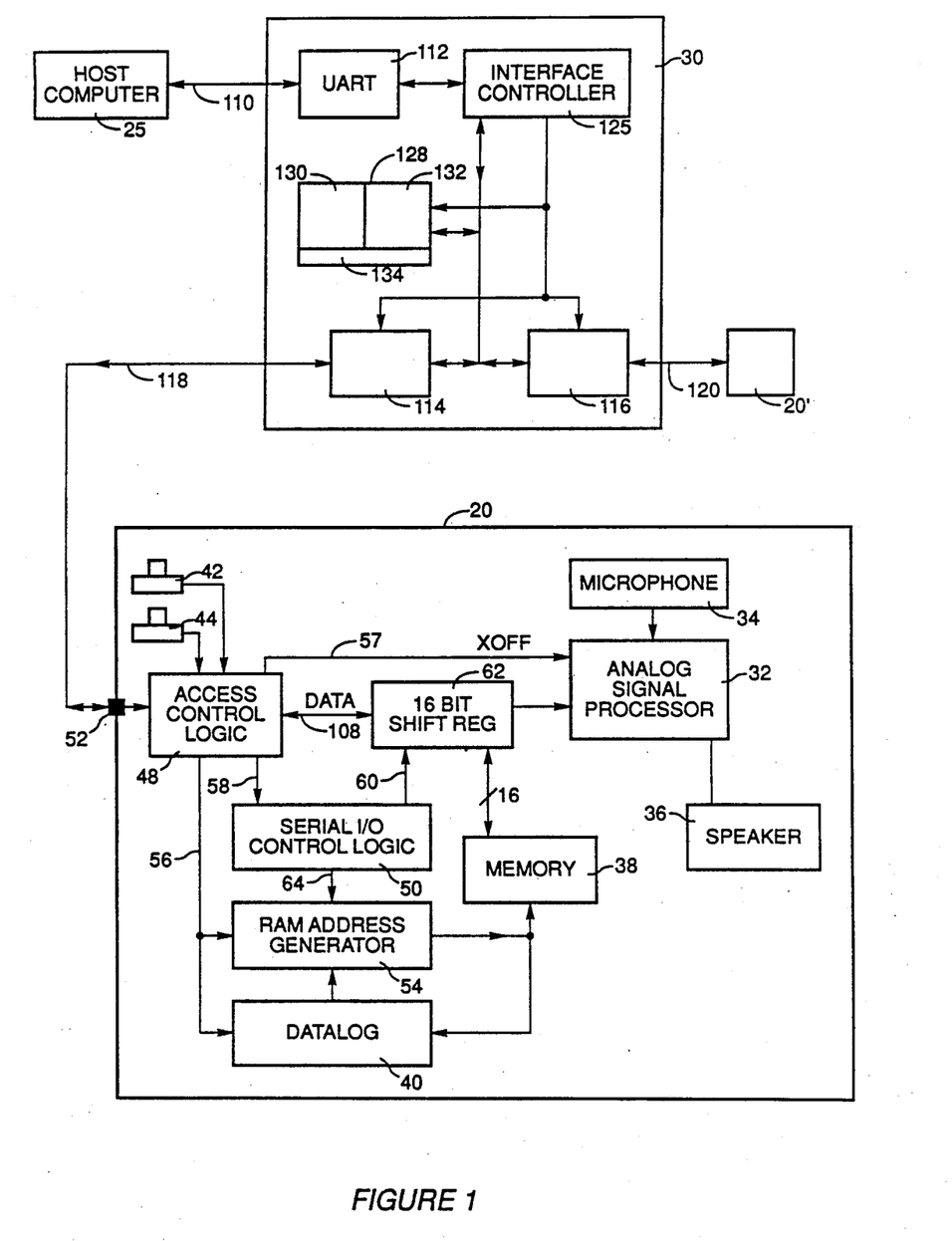
FIG. 1 is a block diagram showing a hearing aid coupled to a hearing aid programming system.

In FIG. 1 a programmable hearing aid 20 is coupled to a host computer 25 by an interface unit 30. As will be described in more detail, the system shown in FIG. 1 is used to load new programs into the hearing aid 20. It can also be used to read the programs and other data stored inside the hearing aid 20.

The hearing aid 20, also known as an auditory prosthesis, can store a number of distinct programs, or sets of parameter values, each designed for use in different audio environments. See U.S. Pat. No. 4,425,481 (Mangold et al., 1984).

The terms "hearing aid programs" and "program data" are used herein to mean: specific settings of a predefined set of hearing aid parameters, selection of a signal processing configuration or strategy, selection of a particular algorithm or set of microprocessor instructions, modification of a hearing aid control program, and/or settings of coefficients in a auditory signal processing program.

The hearing aid 20 stores a multiplicity of programs for controlling an analog signal processor 32, which amplifies and shapes input audio signals from microphone 34. A speaker 36 audibly transmits the resulting processing signals to the user.

Programs or program data are stored in a memory buffer 38 which is also used to store datalogging information, as described in application Ser. No. 175,233, supra. In the preferred embodiment, each program is represented by sixty-eight bits of program data and 24 bits of datalogging data, and the memory 38 is used to store eight programs — for a total of 736 bits of program and datalogging data. The memory 38, which stores a total of 896 bits of data, is also used to store additional datalogging data not relevant to the present invention.

For the convenience of the user, the eight programs stored in memory 38 are linearly arranged in order of sensitivity. By pressing program selection buttons 42 and 44 the user can select new programs, with one button 42 being used to select programs with increasing sensitivity and the other button 44 being used to select programs with decreasing sensitivity.

An access control circuit 48 and a serial I/O control circuit 50 together control several aspects of the hearing aid's operation, including the loading of newly selected programs into the signal processor 32, and communications via a serial input/output port 52. In addition, address generator 54 generates the address signals necessary for accessing the program data and datalogging data in the memory 38.

Program Selection Process

Before explaining how new program data is stored in the hearing aid 20, the operation of the hearing aid's memory access circuitry during program selection is provided as background information.

When the user depresses one of the program selection switches 42 or 44 and thereby selects a new program to be loaded into the signal processor 32, the following sequence of events occurs. The access control circuit 48 detects that the user has selected a new program, and sends a program selection signal on line 56 to the address generator 54. (This same signal is also used by the datalogging circuit 40 for datalogging purposes.)

At approximately the same time, the access control circuit 48 also generates a muting signal XOFF on line 57 which causes the signal processor to stop its normal amplification functions. This prevents the hearing aid from generating loud and unpredictable sounds while new parameters are being loaded into the the signal processor 32. XOFF is disabled when the newly selected program is fully loaded into the signal processor 32. In other words, whenever a new program is selected, the hearing aid automatically stops amplifying audio input signals until the new program is fully loaded into the signal processor 32.

The address generator 54 responds to the program selection signal on line 56 by loading the initial address for the selected program into its X and Y address buffers (not shown).

When a new program is selected, the access control circuit 48 also sends a program load signal on line 58 to the serial I/O control logic circuit 50. In response, the serial I/O control logic circuit 50 controls the process of transmitting four sixteen-bit words from the memory 38 into a slave memory in the signal processor 32, four bits of program data to a tele-coil control circuit (not shown) and twenty-four bits of datalogging data to the datalog circuit 40.

For each of the sixteen-bit words to be transmitted through the shift register 62 to the signal processor 32, the serial logic circuit 50 generates a load signal on line 60 to load the currently addressed contents of the memory 38 in parallel into the sixteen-bit shift register 62, and then transmits a series of shift signals to shift the contents of the shift register 62 into the slave memory in the signal processor 32. In addition, after loading each sixteen-bit word into the shift register 62, the serial control circuit 50 sends a signal on line 64 to the address generator 54, causing the address generator to increment its internal address counter so as to point to the next word of the selected program.

Muting / XOFF

The terms "muting" and "locking" are used in this description to mean inhibiting the signal processing (i.e., amplification and filtering) functions of the hearing aid 20. Terms such as "unlocking" and "to disable muting" mean the resumption of normal operation of the amplification and filtering functions of the hearing aid.

Figure 2:
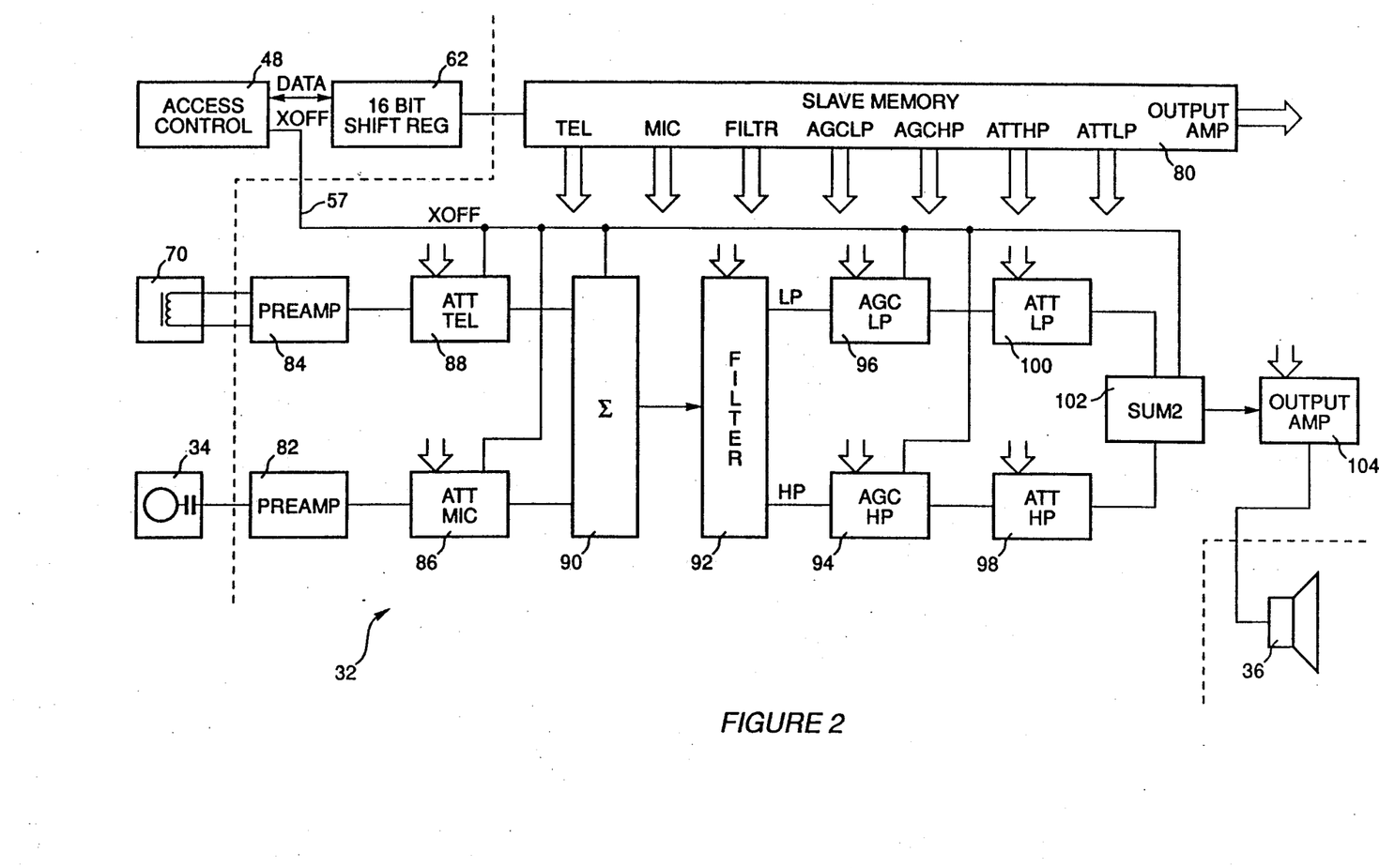
FIG. 2 shows a more detailed block diagram of the analog portion of the hearing aid shown in FIG. 1.

Referring to FIG. 2, there is shown a more detailed diagram of the signal processor 32. The components outside the dashed boundaries of the signal processor 32 correspond to the items with like reference numerals in FIG. 1. In addition, there is shown a telephone pickup 70 for assisting the user during telephone conversations.

The signal processor 32 is a programmable processor whose function is controlled by the parameters stored in a sixty-four bit shift register slave memory 80. The process for loading the slave memory 80 with program data, using shift register 62, is described above. Eight of the parameters stored in the slave memory 80 are labelled TEL, MIC, FILTR, AGC LP, AGC HP, ATT LP, ATT HP, and OUTPUT AMP.

For each of these parameters there is a corresponding circuit block shown in FIG. 2, the function of which is controlled or modified in accordance with the current value of the corresponding parameter.

Briefly reviewing the operation of the signal processor 32, the input signals from each of the input devices, microphone 34 and telephone pickup 70, are passed through preamplifiers 82 and 84 and digitally controlled attenuators ATT MIC 86 and ATT TEL 88. The resulting signals are then summed by summer 90. The output from summer 90 is passed through filter 92, which splits the signal into low and high pass signals LP and HP. The crossover frequency between the low- and high-pass channels can be varied digitally from 500 Hz to 4 KHz, in accordance with the value of the FILTR parameter stored in the slave memory 80.

The low- and high-pass signals are processed in parallel by automatic-gain-controlled amplifiers 94 and 96 and then digitally controlled attenuators ATT HP 98 and ATT LP 100 before being summed together by summer SUM2 102. The thresholds of the automatic-gain-controlled amplifiers 94 and 96 are digitally controlled by threshold setting parameters AGC HP and AGC LP stored in the slave memory 80.

An output amplifier 104 is provided for receiving the summed output of 102 and driving a speaker 36. Alternatively, an external output amplifier can be used to perform the driving function.

As shown in FIG. 2, a number of the components of the signal processor 32 are coupled to XOFF line 57. These components include the digitally controlled attenuators ATT MIC 86 and ATT TEL 88, summer 90, the automatic-gain-controlled amplifiers 94 and 96, and summer 102. All of these components are either disabled, or generate substantially attenuated and muted signals whenever the XOFF signal on line 57 is enabled. As a result, the signal processor's operation is substantially inhibited or muted when XOFF is enabled so as to protect the user's ears during program selection and the loading of new program data.

Program Loading and Reading

During normal operation of the hearing aid 20, the function of the access control logic circuit 48 is twofold: (1) to initiate the loading of selected programs when the user uses switches 42 and 44, and (2) to monitor the serial port 52 for "read" and "write" commands. This part of the discussion concerns how the hearing aid responds to read and write commands.

A write command is a four bit signal having a value of "1100", followed by a two millisecond pause, followed by 896 bits of program data. When the access control logic circuit 48 detects a write command bit sequence "1100" on the serial port 52, it prepares for receiving new program data by generating an XOFF signal on line 57 (to mute the hearing aid during the programming process), and by signaling the serial I/O control logic 64 and address generator circuit 54 to prepare for loading program data. More particularly, the address generator 54 resets its internal address counters to point at the beginning of the hearing aid's memory 38, and the serial I/O control logic 64 synchronizes its internal timer with the beginning of the program data.

As the program data is received, the serial I/O control logic 64 shifts each bit of received data into the sixteen-bit shift register 62. Each set of sixteen bits of data is then loaded in parallel into the memory buffer 38. This process continues until all 896 bits (sixty four sets of sixteen-bit words) of program data have been received and loaded into the program memory 38.

The hearing aid 20 remains muted at the end of the program loading process because it is possible that the program data may have been corrupted during the data transmission process. As will be described below, the memory interface unit 30 is programmed to read and verify the data stored in the hearing aid 20 immediately after new program data has been loaded into the hearing aid 20. Finally, after the interface unit has confirmed that the data read from the hearing aid matches the data it sent to the hearing aid, it sends an "Unlock" signal to the hearing aid.

An unlock signal is a four bit signal having a value of "1101". When the access control logic circuit 48 detects an unlock signal on the serial port, one of the new programs is loaded into the signal processor 32, using the program selection process described above. Then the access control logic turns off the XOFF signal so that the hearing aid can resume normal operation. Thus, the unlock command "unlocks" the hearing aid in that it enables the hearing aid to resume normal operation (i.e., signal processing) after storing new program data.

A read command is a four bit signal having a value of "1110". When the access control logic circuit 48 detects a read command on the serial port 52, it prepares for transmitting the entire contents of its memory buffer 38 by commanding the address generator 54 to reset its internal address counters to point at the beginning of the hearing aid's memory 38, and commanding the serial I/O control logic 64 to read and transmit all of the data in the memory 38.

Sixteen bits at a time, data from the memory 38 is loaded in parallel into the sixteen-bit shift register 62. Each set of sixteen bits of data is then shifted out, over data line 108 to the serial port 52, while the address generator 54 increments its address counters to point at the next sixteen bit word in the memory buffer 38. This process continues until all 896 bits (sixty four sets of sixteen-bit words) of data in the memory buffer 38 have been read and transmitted to the memory interface unit 30.

If the memory interface unit 30 finds no errors in the data read from the hearing aid 20, the entire programming process, including the write, read and Unlock steps, takes almost exactly two seconds.

Memory Interface Unit

The host computer 25 communicates with the hearing aid 20 through a memory interface unit 30. The interface unit 30 may be considered a slave-like extension of the host computer 25 in that its sole function is to perform tasks corresponding to commands sent to it by the host computer 25 via a serial communications line 110.

In the preferred embodiment the host computer is an IBM Model 50, and the memory interface unit 30 is one of the computer's peripheral devices. The serial interface line 110 is a single standard RS-232 serial line over which data is transmitted at a rate of 19200 baud.

The memory interface unit 30 includes three communications circuits 112, 114 and 116 for communications over three data channels. Circuit 112 handles data transmissions with the host computer 25 over serial line 110. In the preferred embodiment circuit 112 is a standard UART device. Circuits 114 and 116 handle data transmissions over two serial communication lines 118 and 120 to two hearing aids 20 and 20'.

It should be noted that for persons using two hearing aids, the hearing aid programs for each ear will often be different. It is therefore important that the program data for a person's left-side hearing aid not be loaded into the person's right-side hearing aid, and vice versa. For this reason the memory interface unit 30 has two distinct hearing aid communications ports or lines 118 and 120. In the preferred embodiments these ports are distinctly labelled "Left Ear" and "Right Ear" so that the user will have the correct program data loaded into each hearing aid to.

Additional components of the memory interface unit 30 include a microprocessor (model Z80 made by Zilog) based controller 125 and a memory buffer 128. The memory buffer 128 is partitioned for convenience into three segments: segment 130 for storing program data received from the host computer, segment 132 for storing data received from a hearing aid 20, and segment 134 for storing program parameters, data values, checksum values and other miscellaneous information needed by the controller 125.

The memory interface unit 30 acts as a memory buffer for programs being loaded into a programmable hearing aid 20. The interface unit 30 also facilitates programming by automatically performing a program verification procedure that checks to see whether the program data stored in the hearing aid 20 is identical to the program data that was transmitted to the hearing aid.

When the host computer 25 sends a command to the memory interface unit 30, the interface unit 30 performs the requested task and then reports back to the host, via the serial communications line 110, with a message, or data, or both, depending on the nature of the command.

Communications between the memory interface and the hearing aids 20 and 20' occur asynchronously at half duplex using pulse width modulation. Data flows at a rate of 1000 baud over communications lines 118 and 120, with each bit frame being 1 millisecond in duration. A bit frame starts with the communication line dropping from a high state to a low state, where the high state is a voltage potential of +1.3 volts and the low state is a voltage potential of −1.3 volts. A data or bit value of "1" is encoded as a pulse with a width of 0.5 millisecond, while a bit value of "0" is encoded as a pulse with a width of just 0.25 millisecond.

Using standard microcontroller technology, the software for the controller 125 is downloaded from the host computer 25 by a resident loader program in the interface unit 30. In other embodiments of the invention the software for the controller 125 can be stored in a read only memory.

PROGRAMMING PROCEDURE

FIGS. 3–10 are flow charts of the procedures used by the controller 125 in the memory interface unit 30 during the hearing aid programming process.

Figure 3:
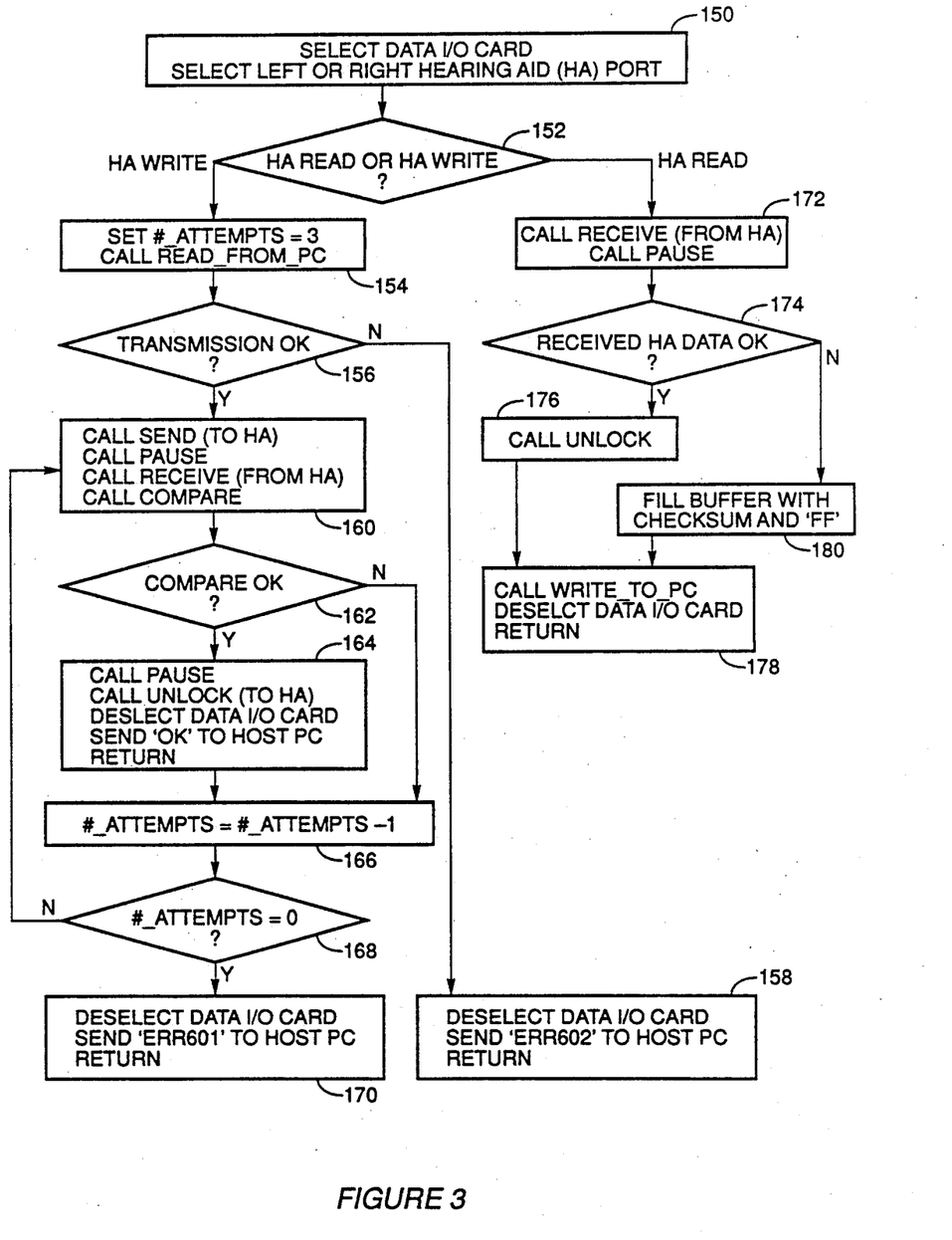
FIG. 3 is a flow chart of the procedure or protocol used for programming a programmable hearing aid.

Referring to FIG. 3, the interface unit 30 can both program and interrogate the hearing aid 20 in response to corresponding commands from the host computer 25. When the host computer 25 sends a command to the interface unit, it sends either a "hearing aid (HA) write" command or a "hearing aid (HA) read" command, along with a designation of either the left or right hearing aid port 118 or 120. The interface unit responds (box 150 in FIG. 3) by selecting or enabling its Data I/O Card and selecting the left or right hearing aid port. The remainder of the interface unit's response to the host computer's command depends on whether the host sent a write or read command (box 152).

Note that in the preferred embodiment the "Data I/O Card" is a physically separate board in the memory interface unit 30 which has the control circuitry for communicating with the hearing aid 20. Thus the Data I/O Card corresponds to communication circuits 114 and 116 in FIG. 1.

MAIN PROGRAM: WRITE TO HEARING AID

When the host sends a write command to the interface unit, the interface unit sets an internal counter called #_ATTEMPTS to a value of three, and calls a subroutine named READ_FROM_PC to receive a set of program data from the host. The READ_FROM_PC routine is described in more detail below with reference to FIGS. 4A–4B.

If the READ_FROM_PC routine fails to successfully receive the program data from the host computer (box 156), the interface unit deselects its Data I/O Card, sends and error code "ERR602" to the host, and exits (box 158). Error code "ERR602" indicates a transmission problem between the host and the interface unit. When this happens the interface unit does not attempt to send the program data to the hearing aid 20.

After successfully receiving the program data from the host computer, the interface unit sends the received program data to the selected hearing aid, pauses briefly, reads the program data stored in the hearing aid, and then compares the program data received from the hearing aid with the program data sent (box 160). If the data received and the data sent match (box 162), an Unlock signal is sent to the hearing aid after a brief pause, the Data I/O Card is deselected, an "OK" message is sent to the host computer to indicate that the hearing aid was successfully programmed, and the routine exits (box 164).

If the data received from the hearing aid does not match the data sent match (box 162), the #_ATTEMPTS variable is decremented (box 166). If less then three attempts have been made to program the hearing aid (i.e., if #_ATTEMPTS is greater than zero) (box 168), the hearing aid programming process is repeated beginning at box 160. After three unsuccessful attempts to program the hearing aid, the interface unit deselects the Data I/O Card, sends and error code "ERR601" to the host, and exits (box 170). Error code "ERR601" indicates a transmission problem between the interface unit 30 and the hearing aid 20.

MAIN PROGRAM: READ DATA IN HEARING AID

When the host sends a read command (box 152), the interface unit reads the program data stored in the hearing aid (box 172). If all 896 bits of the hearing aid data are successfully received (box 174), an Unlock command is sent to the hearing aid (box 176). Then the hearing aid data is sent to the host computer, the Data I/O Card is deselected, and the routine exits (box 178).

If the hearing aid data is not successfully received (box 174), the interface unit overwrites the received data in its memory buffer 132 with "all ones" or "FF's" (box 180) and then sends this data to the host computer (indicating that it failed to read the hearing aid's memory), the Data I/O Card is deselected, and the routine exits (box 178).

READ FROM PC SUBROUTINE

Figure 4A:
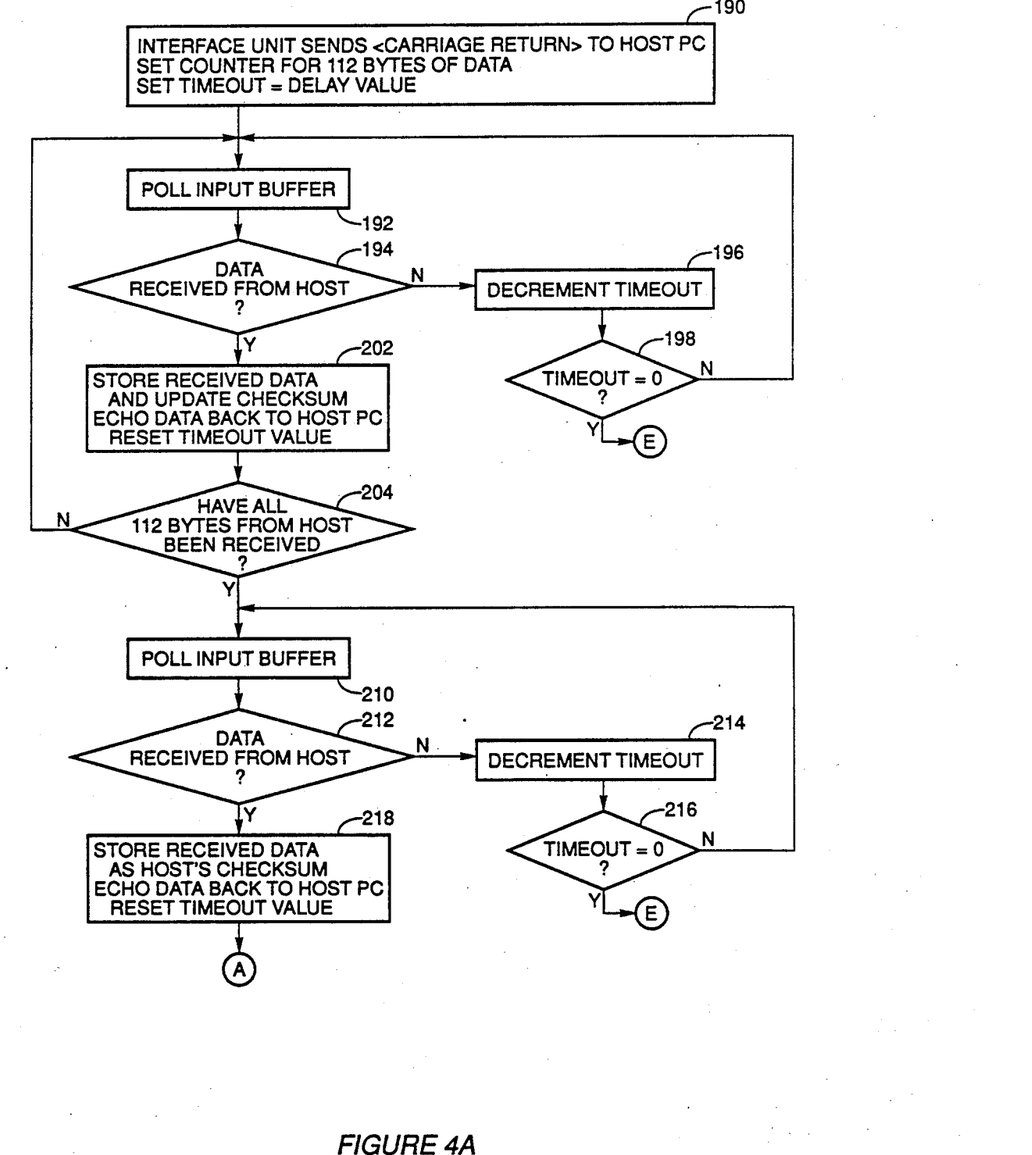
FIGS. 4A-4B are a flow chart of the procedure for receiving data from a host computer.
Figure 4B:
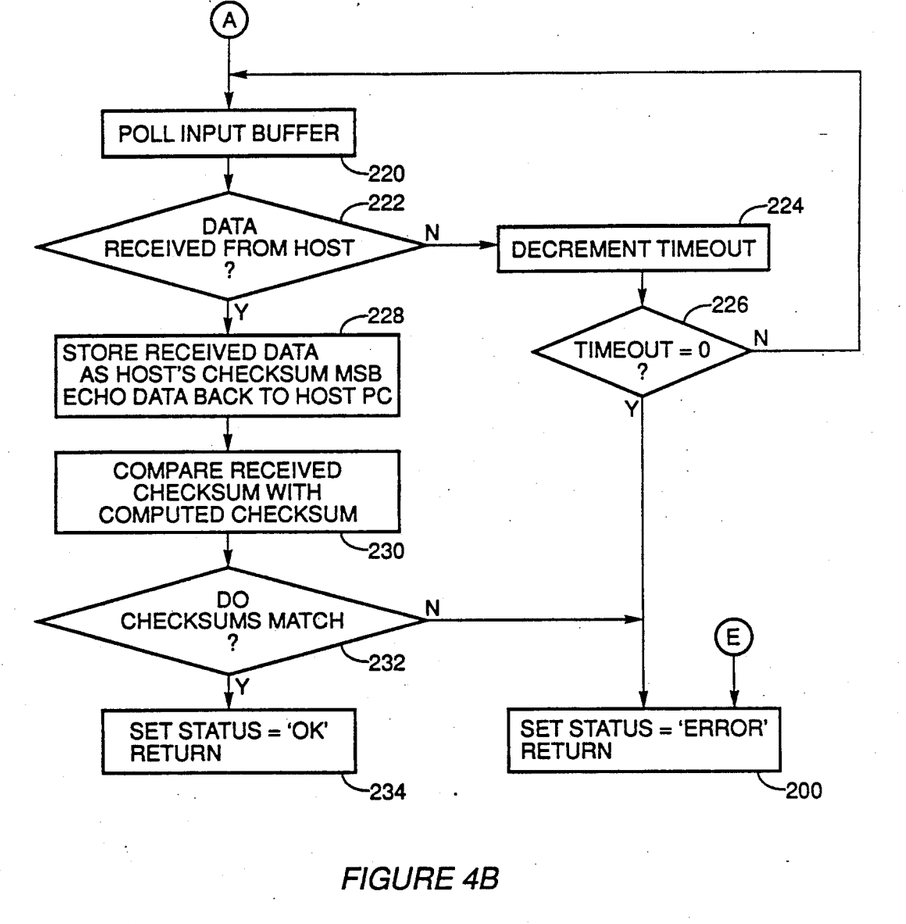

FIGS. 4A–4B show the detailed procedure for receiving program data from the host computer. The interface indicates that it is ready to receive data from the host by sending a carriage return signal to the host, setting an internal counter for 112 bytes of data, and setting a timeout counter to a predefined delay value (box 190).

The procedure for receiving the 112 bytes of program data is as follows. The interface unit polls its input buffer (box 192). If data has been not received from the host (box 194) the timeout counter is decremented (box 196) and the timeout counter is tested (box 198) to determine if communications with the host computer have failed. If timeout has not occurred the input buffer is polled once again (box 192). If timeout has occurred, however, the internal status of the interface unit is set to "ERROR" and the procedure aborts (see box 200 in FIG. 4B).

When data is received from the host computer, it is stored in the interface's internal memory and the received data is used to update an internal checksum value (box 202), as explained in more detail below. In addition, the data received is echoed (i.e., transmitted) back to the host computer so that the host can confirm that the data has been properly received, and the timeout counter is reset to its original delay value (box 202). This data receiving process continues until 112 bytes of data have been received from the host (box 204) or a timeout occurs (box 196).

After 112 bytes of data have been sent by the host and received by the interface unit (box 204), the host computer sends a two byte checksum value corresponding to the program data that it just sent. A standard checksum formula is used to compute the checksums used in the preferred embodiment. As is well known to those skilled in the art, checksum values are often computed in a cumulative fashion as data is received, and the purpose of the checksum value is to detect data transmission errors.

While waiting to receive the least significant byte (the "checksum LSB") of the checksum value from the host computer, the interface unit polls its input buffer (box 210) and a timeout procedure (boxes 212, 214 and 216) is followed which is identical to the timeout procedure described above (boxes 194, 196 and 198).

When the checksum LSB data is received from the host computer, it is stored in the interface's internal memory and echoed back to the host computer (box 218). The timeout counter is also reset to its original delay value (box 218).

Continuing on FIG. 4B, the procedure for receiving the most significant byte of the checksum (the checksum MSB) (boxes 220-228) is identical to the procedure for receiving the checksum LSB.

After the checksum LSB and the checksum MSB have both been received from the host, these checksum values are compared with the checksum values computed by the interface unit as it received the data from the host computer (box 230). If the checksum values match (box 232), the data from the host computer has been successfully received and interface sets its internal status to "OK" and exits from this procedure (box 234); otherwise, interface sets its status to "ERROR" (box 200) before exiting.

SEND DATA TO HEARING AID SUBROUTINE

Figure 5:
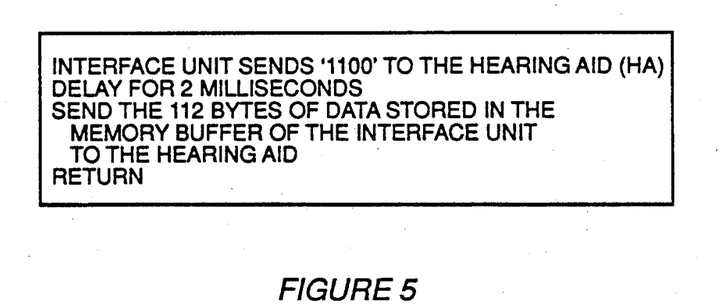
FIG. 5 is a flow chart of the procedure for sending data to a host computer.

Referring to FIG. 5, the interface unit 30 sends data to the hearing aid 20 by sending a write command (i.e., a predefined four bit code, "1100"), waiting for two milliseconds, and then sending the 112 bytes of program data stored in its memory buffer 128 to the hearing aid. As described above, the program data is transmitted at a rate of 1000 bits per second, using pulse width modulation.

READ DATA FROM HEARING AID SUBROUTINE

Figure 6:
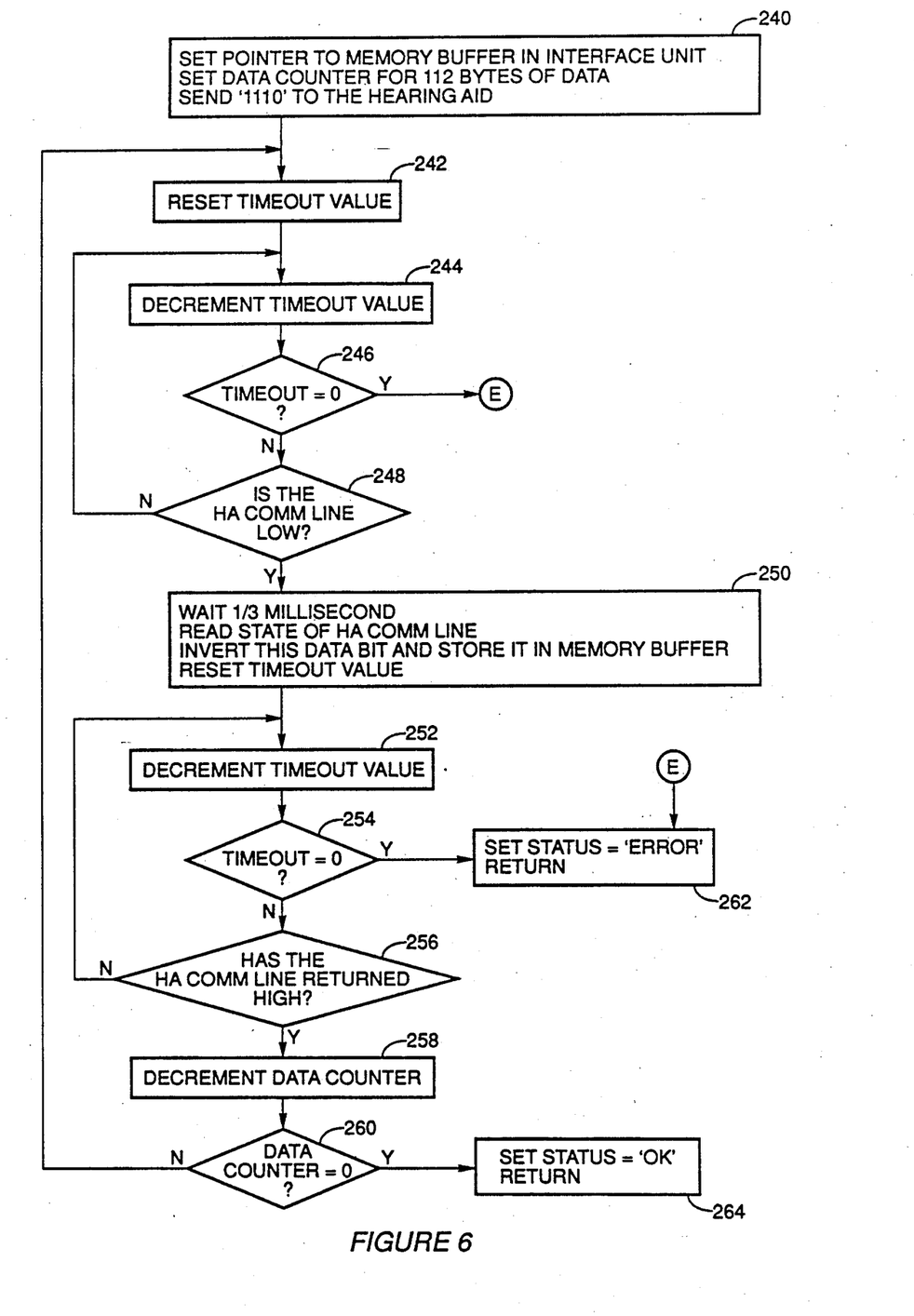
FIG. 6 is a flow chart of the procedure for reading the data stored in the programmable hearing aid.

Referring to FIG. 6, the interface unit prepares for reading the 112 bytes of data stored in the hearing aid's memory 38 (shown in FIG. 1) by setting a pointer to the portion 132 of its own memory 128 for storing data received from the hearing aid, setting a data counter for 112 bytes of data, and sending a read command to the hearing aid (box 240). As described above, a read command is a four bit signal having a binary value of "1110".

The remainder of this subroutine is a loop (boxes 242 through 260) which is repeatedly executed, once for each bit of data received from the hearing aid. To receive 112 bytes of data, this loop is executed 896 times. The purpose of the instructions in the loop is to detect the falling edge, and then the rising edge of each pulse width encoded bit of data. As described above, each bit frame starts with the communication line 118 dropping from a high state to a low state. A data or bit value of "1" is encoded as a pulse with a width of 0.5 millisecond, while a bit value of "0" is encoded as a pulse with a width of just 0.25 millisecond.

The first part of the data reading loop sets a timeout counter (e.g., to a value of 0.75 milliseconds) (box 242) and then waits for a low voltage level to be detected on the hearing aid communication line (boxes 244, 246 and 248). A low voltage level on the line marks the falling edge of a pulse, which is the beginning a new data bit. If a falling edge is not detected within the timeout period, there is a communications problem and the interface unit sets its internal status to "ERROR" (box 262) and exits back to the main routine (see FIG. 3).

After the beginning of a data pulse has been detected, the routine waits for ⅜ millisecond and then reads the state of the hearing aid communication line 118 to determine whether the data bit being read is a "1" or a "0" (box 250). If the line 118 is still low, the data bit being read is a "1" because the pulse width of data bits with a value of "1" is 0.5 millisecond. If the line 118 is high, the data bit being read is a "0" because "0" data bits have a pulse width of 0.25 millisecond.

Using standard binary logic, the state of the line is read as a "0" if the line is at a low voltage and is read as "1" if the line is at a high voltage. Therefore, to obtain the binary value of the data bit being read, the binary "value" of the data line ⅜ millisecond after the beginning of the pulse is inverted and stored in the interface unit's memory buffer.

Next, the routine looks for the end of the current data pulse by resetting the timeout counter (box 250) and waiting (boxes 252, 254 and 256) until the hearing aid communication line is found to be at a high voltage (i.e., +1.3 volts). If a high voltage is not detected within the timeout period, there is a communications problem and the interface unit sets its internal status to "ERROR" (box 262) and exits back to the main routine (see FIG. 3).

When the end of each data pulse is detected (box 256), the data counter is decremented (box 258) and tested to determine if all 896 bits of data have been received (box 260). If not, the procedure resumes at the beginning of the data reading loop (box 242). When all of the data has been received the interface sets its internal status to "OK" (box 264) and exits back to the main routine (see FIG. 3).

PAUSE SUBROUTINE

Figure 7:
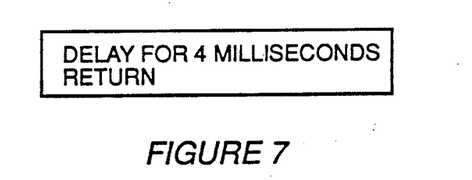
FIGS. 7-10 are flow charts for the Pause, Unlock, Write to PC, and Compare Data subroutine procedures used by the procedure shown in FIG. 3.

Referring to FIGS. 3 and 7, the PAUSE subroutine used by the main program (see boxes 160 and 164) is simply a four millisecond delay which enables the hearing aid to recover from a previously executed read or write command.

UNLOCK SUBROUTINE

Figure 8:
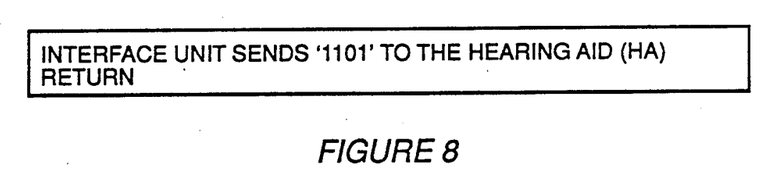

Referring to FIGS. 3 and 8, the UNLOCK subroutine is used by the main program (see box 164) to "unlock the hearing aid" by sending an unlock command (a four bit signal having a value of "1101") to the hearing aid. The unlock command causes the hearing aid to turn off its XOFF signal so that the hearing aid can resume normal operation.

WRITE TO PC SUBROUTINE

Figure 9:
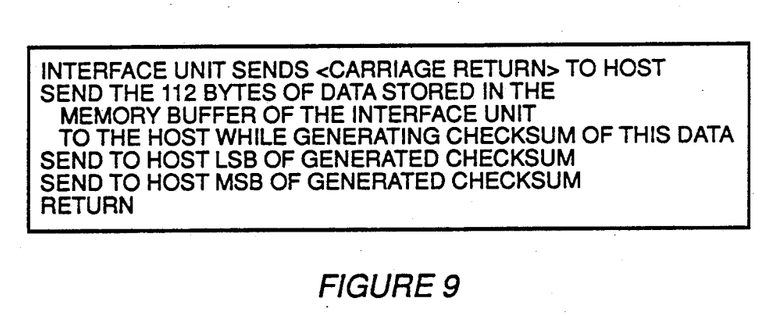

Referring to FIGS. 3 and 9, the WRITE_TO_PC subroutine is used by the main program (see box 178) to send data read from a hearing aid 20 to the host computer 25. The interface 30 indicates that it is ready to send data to the host by sending a carriage return signal to the host. It then sends the 112 bytes of hearing aid data to the host computer (at 19200 baud using standard RS-232 communication protocols) while computing a checksum for this data. As noted above, the checksum is sent so that the host computer can determine whether the data sent by the interface unit has been corrupted by noise. Finally, the two bytes of the checksum are sent to the host before this subroutine exits back to the main routine.

COMPARE DATA SUBROUTINE

Figure 10:
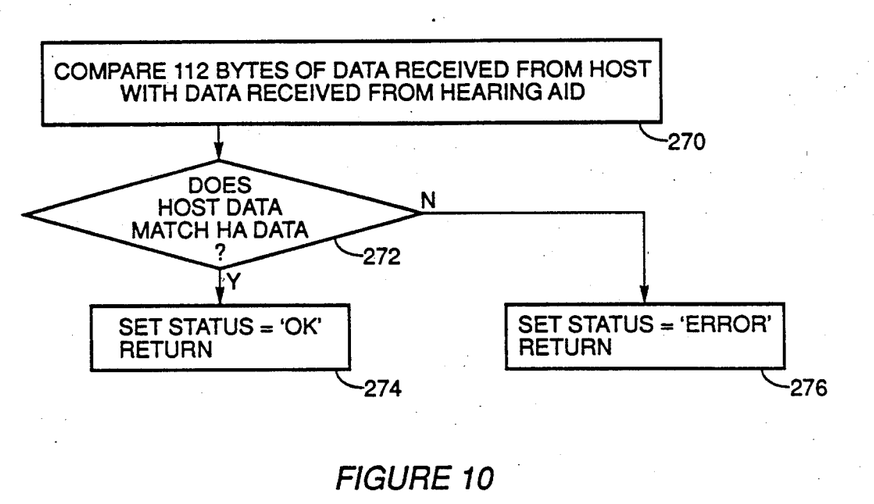

Referring to FIGS. 3 and 10, the COMPARE_DATA subroutine used by the main program (see box 160) compares the 112 bytes of data sent by the host computer with the 112 bytes of data received from the hearing aid after the hearing aid has been programmed with the data from the host computer (box 270). If the host data and hearing aid data match (box 272) the interface sets its internal status to "OK" (box 274) and exits back to the main routine (see FIG. 3). Otherwise the interface sets its internal status to "ERROR" (box 276) before exiting back to the main routine.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An auditory prosthesis, comprising:
   programmable signal processing means for filtering and amplifying auditory signals in accordance with a set of program data;
   program loading means coupled to said signal processing means for loading a specified set of program data into said signal processing means; said program loading means including memory means for storing a plurality of distinct sets of program data, reprogramming means for loading sets of program data from an external source into said memory means, and means for loading one of said plurality of stored sets of program data into said signal processing means after said reprogramming means loads program data from an external source into said memory means; and
   muting means coupled to said signal processing means for temporarily muting said signal processing means while said program loading means loads a set of program data into said signal processing means; said muting means coupled to said reprogramming means and including means for muting said signal processing means while said reprogramming means loads program data from an external source into said memory means and continuing to mute said signal processing means until a set of program data has been loaded into said signal processing means.

2. An auditory prosthesis, comprising:
   programmable signal processing means for filtering and amplifying auditory signals in accordance with a set of program data;
   programming means coupled to said signal processing means for enabling said signal processing means to use a specified set of program data; said programming means including memory means for storing a plurality of distinct sets of program data, program selection means for generating a program selection signal, and means responsive to said program selection signal for enabling said signal processing means to use a corresponding set of program data;
   reprogramming means for loading sets of program data from an external source into said memory means; and
   muting means coupled to said reprogramming means and said signal processing means for muting said signal processing means while said reprogramming means loads program data from an external source into said memory means; said muting means including means for temporarily muting said signal processing means when said program selection means generates a program selection signal until said signal processing means is enabled to use a corresponding set of program data;
   said programming means including means for enabling said signal processing means to use one of said plurality of stored sets of program data after said reprogramming means loads program data from an external source into said memory means; said muting means including means for muting said signal processing means while program data from an external source is being loaded into said memory means and continuing to mute said signal processing means until said signal processing means has been enabled to use a set of program data.

3. A method of programming a hearing aid having programmable signal processing means for filtering and amplifying auditory signals in accordance with a set of program data, said hearing aid further including memory means for storing a plurality of distinct sets of program data, and reprogramming means for loading sets of program data from an external source into said memory means;
   the steps of the method comprising:
   responding to a program selection signal by changing the program data used by said signal processing means; and
   responding to an externally generated write data signal by loading program data from an external source into said memory means in the hearing aid;

temporarily muting said signal processing means while said programming means changes the program data used by said signal processing means and while said reprogramming means loads program data from an external source into said memory means.

4. A method of programming a hearing aid as set forth in claim 3, said step of loading program data from an external source including the step of changing the program data used by said signal processing means after said program data from an external source has been loaded into said memory means;

said muting step including muting said signal processing means while program data from an external source is being loaded into said memory means and continuing to mute said signal processing means until the completion of said step of changing the program data used by said signal processing means.

5. A method of programming a programmable hearing aid, the method comprising the steps of:

providing a programmable hearing aid with receiving means for receiving data transmissions, and memory means coupled to said receiving means for storing program data values received via said receiving means;

sending a predefined write signal and then a set of program data values to the receiving means of the programmable hearing aid;

automatically muting the operation of said programmable hearing aid upon receiving the predefined write signal, and then storing the following program data values in the hearing aid's memory means;

sending an unlock signal to the programmable hearing aid after the set of program data values has been stored in the hearing aid memory means;

said programmable hearing aid responding to said unlock signal by ceasing muting the operation of the programmable hearing aid.

6. A method of programming a programmable hearing aid, the method comprising the steps of:

providing a programmable hearing aid with receiving means for receiving data transmissions, decoding means for decoding said data transmissions, memory means coupled to said receiving means and decoding means for storing program data values received via said receiving means, and read control means coupled to said memory means and said decoding means for transmitting data stored in said memory means when said decoding means detects the receipt of a predefined read signal;

sending a set of program data values to the receiving means of the programmable hearing aid, preceded by a predefined write signal;

automatically muting the operation of said programmable hearing aid upon receiving the predefined write signal;

calculating a first checksum value corresponding to the program data values sent to the programmable hearing aid;

sending a predefined read signal to the receiving means of the programmable hearing aid;

said read control means of the programmable hearing aid responding to said predefined read signal by transmitting the program data stored in the programmable hearing aid;

calculating a second checksum value corresponding to the program data transmitted from the programmable hearing aid;

comparing the first and second checksum values;

generating an error signal when said first and second checksum values do not match; and sending an unlock signal to the programmable hearing aid when said first and second checksum values do match;

said programmable hearing aid responding to said unlock signal by ceasing muting the operation of the programmable hearing aid.

* * * * *